United States Patent [19]

Maruyama et al.

[11] Patent Number: 5,155,165

[45] Date of Patent: Oct. 13, 1992

[54] POLYURETHANE POLYUREA PARTICLES AND PROCESS FOR PRODUCTION THEREOF

[75] Inventors: Osamu Maruyama, Jakarta, Indonesia; Yoichi Abe; Hidenobu Ishikawa, both of Ichihara, Japan; Noboru Okoshi, Sodegaura, Japan

[73] Assignee: Dainippon Ink and Chemicals, Inc., Tokyo, Japan

[21] Appl. No.: 530,415

[22] Filed: May 30, 1990

[30] Foreign Application Priority Data

May 30, 1989 [JP] Japan ................................ 1-137226

[51] Int. Cl.⁵ ............................ C08J 5/00; C08K 5/06
[52] U.S. Cl. .................................. 524/839; 524/846; 528/44; 528/59; 528/61; 528/62; 528/64
[58] Field of Search .................... 424/63, 64; 521/159; 528/64, 44, 59, 61, 62; 524/839, 846

[56] References Cited

U.S. PATENT DOCUMENTS 4,083,831  4/1978  Santosusso ......................... 528/521
4,689,356  8/1987  Peffley et al. ..................... 521/159
4,756,906  7/1988  Sweeny ............................. 424/63

FOREIGN PATENT DOCUMENTS 0317258  5/1989  European Pat. Off. .
2453853  5/1975  Fed. Rep. of Germany .
2906159  8/1980  Fed. Rep. of Germany .

*Primary Examiner*—John Kight, III
*Assistant Examiner*—Duc Truong
*Attorney, Agent, or Firm*—Griffin, Branigan & Butler

[57] ABSTRACT

Polyurethane polyurea particles are obtained by an interfacial polymerization reaction between a hydrophobic phase which is capable of forming a three-dimensional crosslinked structure by reaction and is a mixture comprising a polyisocyanate compound and a polyhydroxy compound with the isocyanate groups being stoichiometrically excessive, and a polyamine in an amount not more than one equivalent of the stoichiometrically excessive isocyanate groups in the hydrophobic phase, and by polyurethanization reaction inside the particles.

35 Claims, No Drawings

POLYURETHANE POLYUREA PARTICLES AND PROCESS FOR PRODUCTION THEREOF

This invention relates to novel and useful polyurethane polyurea particles, and to a process for producing the polyurethane polyurea particles. More specifically, this invention relates to pigmented or non-pigmented polyurethane polyurea particles obtained by urethanization and urea-forming reaction in a particle forming process of a polyisocyanate compound, a polyhydroxy compound and a polyamine compound (to be abbreviated as a polyamine); and to a processs for producing the above particles.

A number of techniques have been reported on an interfacial polymerization method by which a hydrophobic substance is dispersed in an aqueous medium, and in the surface of the dispersed liquid droplets, an organic polymer is grown to form fine particles. Many of these reports are almost common in that a polyisocyanate, polycarboxylic acid chloride and polysulfonic acid chloride are dispersed in water as an organic phase, a polyamine is added to the dispersion, and on the interface of the dispersed shell of an organic polymer such as polyurea, polysulfonamide or a polyester is formed. More recently, many techniques which utilize an interfacial polymerization reaction beteween a polyisocyanate and a polyamine have been reported (for example, Japanese Laid-Open Patent Publication No. 51949/1973, Japanese Laid-Open Patent Publication No. 67003/1987, Japanese Laid-Open Patent Publication No. 149333/1987, and Japanese Patent Publication No. 58610/1988). The characteristic of such interfacial polymerization reaction is that an outside wall-forming substance of the particles is supplied only from outside the particles, but this characteristic also becomes the defect of the interfacial polymerization reaction.

As is well known in the prior art, the shell of particles is formed by a urea-forming reaction beween an amine and an isocyanate, and this reaction proceeds very rapidly even at room temperature. However once the particle shell is formed, the isocyanate groups remaining inside the particles are isolated from the amino groups in the aqueous phase by the shell formed. Accordingly, a subsequent reaction can no longer proceed easily. With further growth of the shell, migration of the isocyanate groups into the amine particles in the aqueous phase is markedly retarded. Consequently, the unreacted isocyanate groups inside the particles are unwillingly left, and the reaction apparently reaches a saturated state.

In solving this problem in designing the particles, however freely one use the prior art, it is impossible to find a way out for the solution of the problem. Rather, the reproducibility of basic particle characteristics is aggregated, and moreover, the unreacted materials build up and accumulate.

On the other hand, urethane urea resins are characterized by having superior toughness to general synthetic resins such as polyester resins, malamine resins, phenolic resins, epoxy resins and urethane resins having no urea linkage. In the field of printing ink and paints, attempts have been made to include an organic or inorganic pigment in the particles to utilize such advantages of the urethane urea resins. However, in the prior art, it is necessary to disperse the pigment using an isocyanate monomer or an isocyanate prepolymer. Hence, in the pigment dispersing step, humidity and moisture must be very strictly controlled, or a complex pretreatment becomes necessary. Moreover, inconveniences such as poor reproducibility, the increase of the cost and gellation during dispersion inevitably occur.

It is an object of this invention to provide polyurethane polyurea particles having fully formed shells and cores and containing, or not containing, a pigment.

As a product meeting the above object, the present invention pvovides polyurethane polyurea particles or pigmented polyurethane polyurea particles from an interfacial polymerization reaction (polyurea-forming reaction) between a hydrophobic phase (1) capable of forming a three-dimensional crosslinked structure by reaction [i.e., a polyisocyanate compound in the hydrophobic phase (1)], said hydrophobic phase being a mixture of a polyisocyanate compound and a polyhydroxy compound with the isocyanate groups being stoichiometrically excessive and (3) a polyamine in an equivalent weight or less than the stoichiometrically excessive isocyanate groups and also from urethanization reaction inside the particles.

The present invention also provides a process for producing polyurethane polyurea particles which are pigmented or not pigmented, which comprises dispersing a hydrophobic phase (1) capable of forming a three-dimensional crosslinking structure by reaction which contains a pigment or does not contain it, and is a mixture comprising a polyisocyanate compound and a polyhydroxy compound in such proportions that the isocyanate groups are stoichiometrically excessive, finely in (2) an aqueous phase containing a protective colloid, and thereafter adding (3) a polyamine in an equivalent weight or less to the above excessive isocyanate groups, and performing interfacial polymerization and urethanization reaction in the particles. The polyisocyanate compound to be used in this invention may be any of those which are known per se. Typical examples include aliphatic, aromatic or alicyclic di- or tri-isocyanate monomers such as tolylene diisocyanate, hydrogenated tolylene diisocyanate, diphenylmethane-4,4'-diisocyanate, hydrogenated diphenylmethane-4,4'-diisocyanate, 1,4'-tetramethylene diisocyanate, 1,6-hexamethylene diisocyanate, xylylene diisocyanate, hydrogenated xylylene diisocyanate, cyclohexyl-1,4-diisocyanate, isophorone diisocyanate and triphenylmethane triisocyanate; various modfied polyisocyanate such as trifunctional or higher polyisocyanurate-type or biuret-type polyisocyanate; and isocyanate-terminated urethane-modified polyisocyanate prepolymers obtained by urethanization of at least one of the above-cited monomers or modified polyisocyanates, and at least one polyhydroxy compound selected from polyhydric alcohols, polyester polyols, polycarbonate polyols, polybutadiene polyols, polypentadiene polyols, etc. These are used singly or in combination of two or more.

In order for the resulting polyurethane polyurea particles (to be referred to as the polymer particles) to have particularly good toughness, the polyisocyanate compounds desirably have a number average molecular weight of 200 to 10,000, preferably 300 to 7,000, especially preferably 500 to 5,000.

The roughness of the polymer particles is further improved if the amount of the urethane-modified polyisocyanate compound obtained by the reaction of polycaprolactone polyester polyol with diisocyanate is adjusted to at least 10% by weight, preferably at least 20% by weight in the hydrophobic phase (1).

In designing the polyisocyanate compound, aliphatic and/or alicyclic isocyanate monomers are recommended in view of weatherability.

The polyhydroxy compound constituting the hydrophobic phase (1) together with the polyisocyanate compound is a very important component for compensating for the lack of interior crosslinking incident to the formation of polymer particles and further increasing the mechanical strength of the polymer particles. These polyhydroxy compounds may be any of those whicn are known. Typical examples are compounds belonging to groups (a) to (g) below.

(a) Polyhydric alcohols such as ethylene glycol, propylene glycol, 1,3-propanediol, 1,4-butanediol, 1,3-butanediol, 1,5-pentanediol, neopentyl glycol, 1,5-pentanediol, neopentyl glycol, 1,6-hexane diol, 1,4-bis (hydroxymethyl)cyclohexane, bisphenol A, hydrogenated bisphenol A, hydroxypivalylhydroxypivalate, trimethylolethane, trimethylolpropane, 2,2,4-trimethyl-1,3-pentanediol, glycerol and hexanetriol; polycarbonate polyols, polybutadiene polyols and polypentadiene polyols, (b) polyether glycols such as polyoxyethylene glycol, polyoxypropylene glycol, polyoxyethylene polyoxytetramethylene glycol, polyopxypropylenepolyoxytetramethylene glycol, and polyoxyethylene polyoxypropylene polyoxytetramethylene glycol, (c) modified polyether polyols obtained by the ring-opening polymerization of the polyhydric alcohols and ethylene oxide, propylene oxide, tetrahydrofuran, ethyl glycidyl ether, propylene glycidyl ether, butyl glycidyl ether, phenyl glycidyl ether and allyl glycidyl ether, (d) polyester polyols obtained by cocondensation reaction of at least one of the above-mentioned polyhydric alcohols and polycarboxylic acids (examples of the polycarboxylic acids include succinic acid, adipic acid, sebacic acid, azelaic acid, phthalic acid, tetrahydrophthalic acid, hexahydrophthalic acid, maleic acid, fumaric acid, citraconic acid, itaconic acid, glutaconic acid, 1,2,5-hexanetricarboxylic acid, 1,4-cyclohexanedicarboxylic acid, 1,2,4-benzenetricarboxylic acid, 1,2,5-benzenetricarboxylic acid, 1,2,4-cyclohexanetricarboxylic acid, and 2,5,7-naphthalenetricarbooxylic acid), (e) Lactone-type polyester polyols obtained by the polycondensation reaction of at least one of the polyhydric alcohols listed above, and a lactone such as epsilon-caprolactone and delta-valerolactone; or lactone modified polyester polyols obtained by the polcondensation of the aforesaid polyhydric alcohols and polyhydric carboxylic acids and lactones, (f) epoxy-modified polyester polyols obtained by using at least one of various epoxy compounds such as bisphenol A-type epoxy compounds, hydrogenated A-type epoxy compounds, glycidyl ethers of monohydric and/or polyhydric alcohols and glycidyl esters of monobasic acids and/or polybasic acids at the time of synthesizing polyester polyols, and (g) polyester polyamide polyols, polycarbonate polyols, polybutadiene polyols, polypentadiene polyols, castor oil, caster oil derivatives, hydrogenated castor oil, hydrogenated castor oil derivatives and hydroxyl containing acrylic copolymers.

The polyhydroxy compounds shown in (a) to (g) may be used singly or in combination. but for sufficient crosslinking of the interiors of the polymer particles, they preferably have a number average molecular weight of 200 to 10,000, preferably 300 to 7,000, especially preferably 500 to 5,000. To obtain tough polymer particles, polyester polyols are preferred. The use of lactone-type polyester polyols obtained by the polycondensation with lactones such as epsilon-caprolactone, delta-valerolactone and 3-methyl-delta-valerolactone is preferred.

In the present invention, the isocyanate equivalent of the polyisocyanate compound to the hydroxyl equivalent of the polyhydroxy compound is from 1:0.1 to 1:0.9, preferably from 1:0.1 to 1:0.8, more preferably from 1:0.2 to 1:0.7. The two components are mixed so that the mixture of the two components may have a three-dimensional crosslinked structure upon reaction. Specifically, these components should be mixed so that when the mixture is completely urethanized, the product becomes a gel which does not become flowable by heating or by dilution with a true solvent. The two conditions for the designing of the hydrophobic phase (1) are essential conditions for obtaining an internal crosslinked state which cannot be obtained by merely performing interfacial polymerization by the addition of the polyamine (3) to be described. These are basic requirements in the present invention. To perform the interfacial polymerization at this time smoothly, it is necessary to use the isocyanate groups in a stoichiometrically excessive amount specified above. This range is preset so that the shells may be rapidly formed. By performing the urethanization in the inside of the particles three dimensionally, the entire particles can have increased toughness, and their solvent resistance is increased unlike the prior art. For the designing of the three-dimensional urethanization reaction of the interiors of the particles, the trifunctional or higer polyisocyanate compound and/or the polyhydroxy compound are adjusted to such amounts that the total amount to be contained in the hydrophobic phase is adjusted to 0.1 mole %, preferably 0.2 mole %, and especially preferably 0.3 mole %, based on the total amount of the polyisocyanate compound and the polyhydroxy compound. By this quantitative adjustment, a good three dimentionally crosslinked state can be obtained in the interior of the particles. As interfacial polymerization proceeds with the polyamine (3), the polyisocyanate groups in the hydrophobic phase (1) are consumed, and the equivalent proportion of the isocyanate groups in the particles approaches that of the hydroxyl groups, and the crosslinking density of the interiors of the particles further increases as the urethanization reaction proceeds. The toughness and durability of the polyurethane polyurea particles of this invention further increasse.

The hydrophobic phase (1) mixed on such a designing concept is finely dispersed in the aqueous phase (2). Then a polyamine is added in an amount of 0.2 to 1.0 equivalent, preferably 0.3 to 1.0 equivalent, more preferably 0.4 to 0.9 equivalent, per equivalent of the excessive isocyanate groups contained in the hydrophobic phase. Then, polyurea-forming reaction is carried out, and the urethanization reaction is carried out in the interior of particles. As a result, very tough, pigmented or non-pigmented polyurethane polyurea particles are obtained.

Known organic pigments, inorganic pigments and extender pigments may be used as the pigment in this invention. Typical examples of the organic pigments include insoluble azo pigments such as Benzidine Yellow, Hansa Yellow and Lake Red 4R; soluble azo pigments such as copper phthalocyanine pigments such as Phthalocyanine Blue and Phthalocyanine Green, basic dyed lakes such as Rhodamine Lake and Methyl Violet Lake; acid dyed lakes such as Quinoline Lake and Fast Sky Blue; mordant dye-dyed pigments such as Alizarine Lake; vat dye-dyed pigments such as pigments of the anthraquinone, thioindigo and pellinon type; quinacridone pigments such as Cinquasia Red FB; dioxazine-type pigments such as Dioxazine Violet; and condensed azo pigments such as Cromophtal.

Examples of the inorganic pigments include chromate salts such as Chrome Yellow, zinc chromate and Molybdate Orange; ferrocyanide compounds such as Prussian Blue; sulfides such as Cadmium Yellow, Cadmium Red and mercury sulfide; sulfates such as barium sulfate and lead sulfate; silicates such as calcium silicate and ultramarine; carbonate salts such as clacium carbonate and magnesium carbonate; phosphate salts such as Cobalt Violet and Manganese Violet; metal powders such as aluminum powder, gold powder, silver powder and brass powder; and pearlescent pigment.

Examples of the extender pigments are precipitated barium sulfate, barium carbonate, chalk, gypsum, alumina white, clay, silica, silica white, talc, calcium silicate and precipitated magnesium carbonate.

The pigment may be pre-kneaded with at least one of the polyhydroxy compounds and used as a mill base. As required, before use, the pigment may be surface treated. Alternatively, in kneading, two or more pigments may be used in combination, and additives such as a pigment dispersing agent or an antiflooding agent known in the paint industry or printing ink industry may be used together. The kneading may be carried out by using a known dispersing machine such as a ball mill, a pebble mill, a sand mill, an attrite, a roll mill, a high-speed impeller dispersing machine, and a high-speed stone mill. As required, an organic solvent inert to hydroxyl groups or isocyanate groups may be added to adjust the viscosity of the kneaded mixture. Aromatic hydrocarbons, aliphatic hydrocarbons, esters, ethers and ketones are suitable as the organic solvent to be used. Especially suitable are benzene, toluene, xylene, cyclohexane, methylcyclohexane, diphenyl ether, and mineral spirits. The proportions of the resin and the pigment in the mill base kneading step are such that the amount of the pigment is 1 to 900 parts by weight, preferably 2 to 800 parts by weight, especially preferably 5 to 500 parts by weight, per 100 parts by weight of the resin as solids.

The resulting mill base, the polyhydroxy compound and the polyisocyanate compound are mixed in the aforesaid mixing proportions and uniformly mixed to form a hydrophobic phase (1). The amount of the pigment contained in the hydrophobic phase is 0.5 to 200 parts by weight, preferably 1 to 150 parts by weight, especially preferably 2 to 100 parts by weight, per 100 parts by weight of the entire resins as solids.

The hydrophobic phase (1) is finely dispersed in the aqueous phase (2). A polyamine (3) is added in an amount of 0.2 to 1.0 equivalent, preferably 0.3 to 1.0 equivalent, especially preferably 0.4 to 0.9 equivalent, per equivalent of the excessive isocyanate groups contained in the hydrophobic phase (1), and on the surface of the particles, urea-forming reaction is carried out. Simultaneously with it, urethanization reaction is effected in the interiors of the polymer particles to give very tough pigmented polyurethane polyurea particles. Polyamines (3) to be used preferably in this invention are known diamines and polyamines, and mixtures of these. Typical examples include 1,2-ethylenediamine, hydrazine, hydrazine-2-bis-(3-aminopropyl)-amine, 1,4-diaminocyclohexane, 3-amino-1-methylaminopropane, N-hydroxyethylethylenediamine, N-methyl-bis-(3-aminopropyl)-amine, tetraethylenediamine, hexamethylenediamine, 1-aminoethyl-1,2-ethylenediamine, diethylenetriamine, tetraethylenepentamine, pentaethylenehexamine, phenylenediamine, tolylenediamine, 2,4,6-triaminotoluenetrihydrochlorides, 1,3,6-triaminonaphthalene, isophoronediamine, xylylenediamine, hydrogenated xylylenediamine, 4,4'-di-diaminophenylmethane, hydrogenated 4,4'-diaminodiphenylmethane, and derivatives of these polyamine monomers. From the viewpoint of weatherability, aliphatic and/or alicyclic polyamines are desirable.

The hydrophobic phase (1) to be dispersed in the aqueous phase in this invention may be reduced in viscosity and increase the dispersibility of the hydrophobic phase in the aqueous phase by adding, as required, a non-reactive hydrophobic organic solvent. The amount of the organic solvent in this case is suitably not more than 50% by weight, preferably not more than 40% by weight, especially suitably not more than 30% by weight, based on the entire hydrophobic phase. Examples of organic solvents that can be used include aromatic hydrocarbons, aliphatic hydrocarbons, esters, ethers, and ketones. Especially preferred are benzene, toluene, xylene, cyclohexane, methylcyclohexane, diphenylether and mineral spirits. As required, these organic solvents may be removed by heating or pressure reduction during or after forming polymer particles.

The aqueous phase (2) in which the hydrophobic phase (1) is to be dispersed contains 0.2 to 20% by weight of at least one protective colloid such as polyvinyl alcohol, hydroxyalkyl celluloses, carboxyalkyl celluloses, gum arabic, polyacrylates, polyacrylamides, polyvinylpyrrolidone and ethylene maleic anhydride copolymer. The aqueous phase (2) may contain 0.2 to 10% by weight of nonionic, anionic or cationic surface-active agents.

In the present invention, urethanization should be positively carried out in the interior of the polymer particles. As is well known, the speed of urethanization between hydroxyl groups and isocyanate groups tends to be slower than the speed of urea-forming reaction between the isocyanate groups and the amino groups especially when the isocyanate groups are base on an aliphatic or alicyclic compound. The speed of reaction between water and isocyanate groups is much slower than the speed of reaction between hydroxyl groups and isocyanate groups by the isolating effect of a shell formed by the addition of the polyamine, the penetration into the interior of the particles can be ignored. Accordingly, in the present invention, by elevating the reaction temperature and spending a long period of time, urethanization reaction can be carried out in the particles.

The present inventors found, however, as a result of performing studies in order to improve these reaction conditions, that by adding at least one organic metal catalyst such as cobalt naphthenate, zinc naphthenate, stannous chloride, stannic chloride, tetra-n-butyltin, tri-n-butyltin acetate, n-butyltin tri-chloride, trimethyltin hydroxide, dimethyltin dichloride, di-n-butyltin diacetate, di-n-butyltin dilaurate and tin octenate in an amount of 5 to 10,000 ppm, preferably 10 to 5,000 ppm, based on the hydrophobic phase, tough crossllinked particles can be formed within a very short period of time. These organic metal catalysts very effectively promotes the reaction between isocyanate groups and hydroxyl groups.

To add the organic metal catalyst to the hydrophobic phase (1) before it is dispersed in water finely is not practical because the hydrophobic phase is gelled by urethanization or the viscosity of the hydrophobic phase rises to reduce its dispersibility in the aqueous phase. If the organic metal catalyst is added after the addition of the polyamine, it is not always be suitable because the organic metal catalyst is difficult of being taken up in the inside of the particles owing to the shell of the particles being formed, and the promotability of urethanization reaction in the inside of the particles is lowered. The most suitable time of adding the organic metal catalyst is between the step of dispersing the hydrophobic phase (1) to the aqueous phase (2) and the step of adding the polyamine (3).

If the particles of this invention meet the basic requirements, they may include various substances as a core material in the particles. The core material is finally taken up into the interiors of the particles by including it in the hydrophobic phase (1) in advance. Typical examples of the core substances include not only the pigments cited hereinabove, but also medicines, perfumes, catalysts, foodstuffs, adhesives, detergents, enzymes, various chemical products and rust inhibitors. As required, the particles of this invention may contain plasticizers, paraffins, animal and vegetable oils, silicone oils and synthetic resins (e.g., xylene resins and ketone resins) so long as they are inert to the isocyanate groups.

The processs for producing the polyurethane polyurea particles of this invention will be briefly described specifically.

a) The step of dispersing the hydrophobic phase (1) in the aqueous phase (2) is carried out preferably at 10° to 35° C. to stabilize the dispersion. The dispersion may be carried out easily by a suitable dispersing device such as a homogenizer, a homodisperser or a propellar-type general stirrer or by a customery action.

b) In many cases, it is preferred to stir the dispersion mildly by using a propellar-type stirrer after the end of the dispersing step.

c) Before or after the addition of the polyamine, particularly before it, an organic metal catalyst promoting urethanization reaction, such as dibutyltin dilaurate, is added in an amount of 5 to 10,000 ppm based on the entire dispersion.

d) The polyamine (3) is added to the dispersion at a temperature of 10° to 35° C. Preferably, the polyamine (3) is added after it is diluted with water so that its effective amount becomes 5 to 70%.

e) After several tens of minutes to several hours, the reaction temperature is elevated to 40° to 95° C., preferably 50° to 90° C., the reaction mixture is maintained at this temperature for 1 to several hours to give tough crosslinked polyurethane polyurea particles which are nearly perfectly spherical.

f) The resulting particles are used according to the respective purposes. They may be used in the form of a fine powder after drying them by a spray drying method, a concentric separating drying method, a filtration drying method or a fluidized bed drying method.

In the polyurethane polyurea particles of the invention so obtained, the reaction is sufficiently completed so such an extent that no appreciable trace of the unreacted isocyanate groups is seen in the interior. Accordingly, the polyurethane polyurea particles are very tough and have excellent solvent resistance. The particles including a core substance are protected from a mechanical destruction, an organic solvent or from natural environments such as water or sunlight, and a chemical change of the core substance by remaining active isocyanate groups is avoided.

In particular, the pigmented polyurethane polyurea particles are very useful and have a great utilization value in the paint industry and the printing ink industry.

The following Examples illustrate the present invention. Parts and percentages are by weight unless otherwise specified.

The various starting materials used in the following examples were as follows:

(A) Polyisocyanate compounds
  (1) "Bernock DN-950" (hexamethylene diisocyanate adduct-type polyisocyanate resin, isocyanate group concentration calculated as solids content=16.8%; produced by Dainippon Ink and Chemicals, Inc.) [hereinafter PI-1].
  (2) "Bernock DN-980S" (isocyanurate-type polyisocyanate resin obtained by using hexamethylene diisocyanate, isocyanate group concentration =21.0%) produced by Dainippon Ink and Chemicals, Inc.) [hereinafter PI-2].
  (3) Polyisocyanate group having an isocyanate group concentration of 7.5% obtained by urethanization of 1,000 parts of polycaprolactone polyester triol obtained by polycondensation between trimethylolpropane and epsilon-caprolactone, and 666 parts of isophorone diisocyanate [hereinafter PI-3].
  (4) Hydrogenated 4,4'-diphenylmethane diisocyanate [hereinafter H-MDI1].
  (5) 1,6-Hexamethylenediisocyanate [hereinafer HDI].
(B) Polyhydroxy compounds
  (1) Polycaprolactone polyester diol having a hydroxyl value of 187 obtained by polycondensation between neopentyl glycol and epsilon-caprolactone [hereinafter PO-1].
  (2) Polycaprolactone polyester triol having a hydroxyl value of 168.5 obtained by polycondensation between trimethylolpropane and epsilon-caprolactone [hereinafter PO-2].
  (3) Polycaprolactone polyester triol having a hydroxyl value of 112.2 obtained by polycondensation of trimethylolpropane and epsilon-caprolactone [hereinafter PO-3].
(C) Polyamine compounds
  (1) Ethylenediamine [hereinafter EDA].
  (2) 1,6-Hexamethylenediamine [hereinafter HMDA].
  (3) Isophoronediamine [hereinafter IPDA].
D) Pigments
  (1) Fastogen Super Red 7093Y (a quinacridone-type organic pigment produced by Dainippon Ink and Chemicals, Inc.).
  (2) Symuler Fast Yellow 4192 (a benzimidazolone-type organic pigment produced by Dainippon Ink and Chemicals, Inc.).
  (3) Fastogen Blue GFA (a phthalocyanine-type organic pigment produced by Dainippon Ink and Chemicals, Inc.).
  (4) Tipaque R-820 (rutlle-type titanium dioxide produced by Ishihara Sangyo Kabushiki Kaisha).

EXAMPLE 1

An aqueous phase (2) was prepared in a 1000 ml flask by dissolving 6 parts of "PVA-217" (a partially saponified polyvinyl alcohol produced by Kuraray Inc. and 9 parts of "PVA-295" (a partially saponified polyvinyl alcohol produced by Kuraray Inc.) in 285 parts of water. In a separate receptacle, 55.7 parts of PI-1, 9.3 parts of HDI and 30 parts of PO-1 were mixed to prepare a hydrophobic phase (1). At 20° C., the aqueous phase was agitated by using a homomixer at 7,000 to 7,500 rpm, and the hydrophobic phase (1) prepared was added to the aqueous solution, and the mixture was stirred for 1 minute to prepare a dispersion. The resulting dispersion was transferred to another flask, and with stirring at 200 rpm by a paddler-type stirring vane, 0.1 part of di-n-butyltin dilaurate (DBTDL), and two minutes later, 21.7 parts of a 50% aqueous solution of HMDA were mixed with the dispersion. The mixture was maintained at room temperature (about 25° C.) for 2 hours. Then, it was heated to 50° C., maintained at this temperature for 1 hour, and further at 80° C. for 2 hours to obtain a suspension of the desired polyurethane polyurea particles having an average particle diameter of 30 micrometers.

EXAMPLE 2

Example 1 was repeated except that the following compounds were used instead of those used in Example 1.

Aqueous phase

19 Parts of "Fujichemi HEC AL-15F" (hydroxyethyl cellulose produced by Fujichemical Co. and 356 parts of water.

Hydrophobic phase

20 Parts of PI-2, 56 parts of PI-3, 24 parts of PO-2, and 25 parts of toluene.

Urethanization catalyst 0.18 parts of DBTDL.

Polyamine 5.6 Parts of a 50% aqueous solution of EDA.

As a result, a suspension of completely crosslinked particles were obtained. The particles had an average particle diameter of 20 micrometers.

EXAMPLE 3

Example 1 was repeated except that the following substances were used instead of those used in Example 1.

Aqueous phase 19 Parts of "Fujichemi HEC Al-15F" and 356 parts of water

Hydrophobic phase 68.8 Parts of PI-3,
10.7 parts of H-MDI,
20.5 parts of PO-3, and
25 parts of xylene.

Urethanization catalyst 0.18 part of DBTDL.

Polyamine 57.1 Parts of a 25% aqueous solution of IPDA

As a result, a suspeneion of completely crosslinked particles were obtained. The particles had an average particle size of 15 micrometers.

EXAMPLE 4

Example 1 was repeated except that the following substances were used instead of those used in Example 1.

Aqueuos phase

9 Parts of "PVA-205",
10 parts of PVA-217", and 356 parts of water.

Hydrophobic phase 29.5 Parts of PI-1,
28.3 parts of PI-3,
42.2 parts of PO-4, and
25 parts of toluene.

Urethanization catalyst 0.18 parts of DBTDL.

Polyamine 6.9 Parts of a 25% aqueous solution of EDA.

As a result, a suspension of completely crosslinked particles was obtained. The particles had an average particle diameter of 25 micrometers.

EXAMPLE 5

Example 1 was repeated except that the following substances were used instead of those used in Example 1.

Aqueous phase

9 Parts of "PVA-205",
10 parts of "PVA-217", and
273 parts of water.

Hydrophobic phase 18.1 Parts of PI-1,
33.7 parts of PI-2,
48.2 parts of PO-3, and
25 parts of toluene.

Urethanization catalyst 0.18 Parts of DBTDL.

Polyamine 24.9 parts of a 30% aqueous solution of IPDA.

As a result, a suspension of completely crosslinked particles was obtained. The particles had an average particle diameter of 25 micrometers.

REFERENTIAL EXAMPLE 1 (preparation of a mill base)

Eighty parts of PO-2, 20 parts of Fastogen Super Red 7093Y and 25 parts of toluene were mixed, and then dispersed for 1 hour by a sand grinder to obtain a red mill base (MB-1).

REFERENTIAL EXAMPLE 2 (ditto)

Referential Example 1 was repeated except that 20 parts of Symuler Fast Yellow 4192 was used instead of the pigment in Referential Example 1 to give a yellow mill base (MB-2).

REFERENTIAL EXAMPLE 3 (ditto)

Referential Example 1 was repeated except that 20 parts of Fastogen Blue GFA was used instead of the pigment used in Referential Example 1 to give a blue mill base (MB-8).

REFERENTIAL EXAMPLE 4 (ditto)

30 parts of PO-2, 70 parts of Tipaque R-820 and 25 parts of toluene were mixed and kneaded on a three roll mill to give a white mill base (MB-4).

EXAMPLE 6

An aqueous phase (2) was prepared in a 1000 ml flask by dissolving 3 parts of "PVA-217" (a partially saponified polyvinyl alcohol made by Kuraray Inc.) and 3 parts of "PAV-205" (a partial saponified product of polyvinyl alcohol produced by Kuraray Inc.) in 294 parts of water. In a separate receptacle, 37.5 parts of MB-1, 16 parts of PO-1, 30 parts of PI-1 and 20 parts of HBI were mixed to prepare a hydrophobic phase (1). While the aqueous phase (2) was stirred by a homomixer at 7,000 to 7,500 rpm, the hydrophobic phase (1) was added, and then, 0.2 part of di-n-butyltin dilaurate (DBTDL) was added. The mixture was stirred for 1 minute to give a dispersion. The dispersion was transferred to another flask, and stirred by a paddler-type stirring vane at 200 rpm, and 22.3 parts of a 25% aqueous solution of EDA was added. The mixture was maintained at about 25° C. for 2 hours, then heated to 50° C., and further reacted at 80 ° C. for 2 hours to obtain a suspension of the desired pigmented red polyurethane polyurea particles. The particles had an average particle diameter of 37 micrometers.

EXAMPLE 7

Example 6 was repeated except that the following compounds were used instead of the substances used in Example 6.

Aqueous phase 15 parts of "Fujichemi HEC AL-15F" and
285 parts of water.

Hydrophobic phase 37.5 parrts of MB-2,
17.5 parts of PO-2,
25 parts of PI-2,
20 parts of H-MDI, and
25 parts of toluene.

Urethanization catalyst 0.2 Part of DBTDL.

Polyamine 31.3 Parts of a 25% aqueous solution of HMDA.

As a result, a suspension of completely crosslinked pigmented yellow particles was obtained. The particles had an average particle diameter of 34 micrometers.

EXAMPLE 8

Example 6 was repeated except that the following compounds were used instead of those used in Example 6.

Aqueous phase 15 parts of "Fujichemi HEC AL-15F" and
285 parts of water.

Hydrophobic phase 37.5 partrs of MB-3,
10 parts of PO-3,
32.5 parts of PI-3, and
20 parts of H-MDI.

Urethanization catalyst 0.2 Part of DBTDL.

Polyamine 10 parts of a 25% aqueous solution of EDA.

As a result, a suspension of pigmented blue particles was obtained. The particles had an average particle diameter of 38 micrometers.

EXAMPLE 9

Example 6 was repeated except that the following compounds were used insted of the substances used in Example 6.

Aqueous phase 1.5 Parts of "PVA-217",
1.5 parts of "PVA-205", and 297 parts of water.

Hydrophobic phase 44.6 Parts of MB-4,
25 parts of PO-2
25 parts of PI-2, and
15 parts of H-MDI Urethanization caatalyst 0.2 Part of DBTDL.

Polyamine 18.9 Parts of a 25% aqueous solution of EDA.

As a result, a suspension of completely crosslinked white pigmented particles was obtained. The particles had an average particle diameter of 45 micrometers.

COMPARATIVE EXAMPLE 1

As an example in which no polyhydroxy compound was used, 35 parts of PI-1, 35 parts of "Tipaque R-820" and 30 parts of toluene were dispersed by a sand grinder. Foaming ocuurred in the dispersion and finally, apparently gellation occurred. To subject them to a mill base test had to be given up.

COMPARATIVE EXAMPLE 2

As an example in which no polyhydroxy compound was used "Tipaque R-820" was changed to one obtained by hot air drying at 120° C. for 10 hours. Otherwise, Comparative Example 1 was repeated. A white mill base was obtained, but on storage for 24 hours, it became a gel. Hence, the gel could not be used for the synthesis of particles.

COMPARATIVE EXAMPLE 3

Thirty parts of dioctyl adipate, 70 parts of Tipaque R-820, and 25 parts of toluene were mixed and kneaded by a three roll mill to prepare a white mill base (MB-5).

Example 9 was repeated except that MB-5 was used instead of MB-4, and dioctyl adipate was used instead of PO-2. A suspension of white particles having an average particle diameter of 32 micrometers was obtained.

COMPARATIVE EXAMPLE 4

Referential Example 1 was repeated except that dibutyl phthalate was changed to dibutyl phthalate instead of PO-2. A red mill base (MB-6) was obtained.

Example 6 was then repeated except that MB-6 was used instead of MB-1, and instead of PO-1, dibutyl phthalate was used instead of PO-1. A suspension of red particles was obtained. The particles had an average particle diameter of 24 micrometers.

TEST EXAMPLES

The particles obtained in Examples 6 to 9 and Comparative Examples 3 and 4 were washed with water, and dried. Fourty parts of the particles in each of the examples were mixed with 30 parts of toluene or butyl acetate, and 150 parts of glass beads having a diameter of 1 mm were added. They were dispersed for 30 minutes at 1,500 rpm by a sand grinder, whereby the tenaciousness of the particles (resistance to destruction by dispersion) was tested.

The results are tabulated below.

| | | Example | | | | Comparative Example | |
|---|---|---|---|---|---|---|---|
| | | 6 | 7 | 8 | 9 | 3 | 4 |
| Tenaciousness of particles | Dispersed state | No change (uniform dispersion) | | | | At least 50% of the particles were destroyed | |
| | State of the supernatant | Very clear | | | | Entirely hazy | |

We claim:

1. Polyurethane polyurea particles having fully formed shells and cores which are capable of containing a pigment obtained by reacting a polyisocyanate compound selected from the group consisting of aliphatic di-to tri-isocyanate monomers, aromatic di-to tri-isocyanate monomers, alicyclic di-to tri-isocyanate monomers, tri-to higher polyisocyanurate polyisocyanates, biuret polyisocyanates and isocyanate-terminated urethane-modified polyisocyanate prepolymers, a polyhydroxy compound selected from the group consisting of polyhydric alcohols, polyether glycols, modified polyether polyols, polyester polyols, lactone-containing polyester polyols, epoxy-modified polyester polyols, polyester polyamide polyols, polycarbonate polyols, polybutadiene polyols, polypentadiene polyols, castor oil, castor oil derivatives and hydroxy-containing acrylic copolymers and a polyamine compound selected from the group consisting of aromatic polyamines, aliphatic polyamines and alicyclic polyamines.

2. Pigmented polyurethane polyurea particles composed of polyurethane polyurea particles having fully formed shells and cores which contain a pigment obtained by reacting a polyisocyanate compound selected from the group consisting of aliphatic di-to tri-isocyanate monomers, aromatic di-to tri-isocyanate monomers, alicyclic di-to tri-isocyanate monomers, tri-to higher polyisocyanurate polyisocyanates, biuret polyisocyanates and isocyanate-terminated urethane-modified polyisocyanate prepolymers, a polyhydroxy compound selected from the group consisting of polyhydric alcohols, polyether glycols, modified polyether polyols, polyester polyols, lactone-containing polyester polyols, epoxy-modified polyester polyols, polyester polyamide polyols, polycarbonate polyols, polybutadiene polyols, polypentadiene polyols, castor oil, castor oil derivatives and hydroxy-containing acrylic copolymers and a polyamine compound selected from the group consisting of aromatic polyamines, aliphatic polyamines and alicyclic polyamines, and a pigment.

3. Polyurethane polyurea particles having fully formed shells and cores which are capable of containing a pigment, obtained by an interfacial polymerization reaction between a hydrophobic phase which is a mixture containing a polyisocyanate compound selected from the group consisting of aliphatic di-to tri-isocyanate monomers, aromatic di-to tri-isocyanate monomers, alicyclic di-to tri-isocyanate monomers, tri-to higher polyisocyanurate polyisocyanates, biuret polyisocyanates and isocyanate-terminated urethane-modified polyisocyanate prepolymers and a polyhydroxy compound selected from the group consisting of polyhydric alcohols, polyether glycols, modified polyether polyols, polyester polyols, lactone-containing polyester polyols, epoxy-modified polyester polyols, polyester polyamide polyols, polycarbonate polyols, polybutadiene polyols, polypentadiene polyols, castor oil, castor oil derivatives and hydroxy-containing acrylic copolymers in such proportions that isocyanate groups are stoichiometrically excessive and which can form a three-dimensional crosslinked structure by reaction, and a polyamine selected from the group consisting of aromatic polyamines, aliphatic polyamines and alicyclic polyamines which has proportions less than equivalent of the stoichiometrically excessive isocyanate groups in the hydrophobic phase, and by a urethanization reaction in the interiors of the particles.

4. Pigmented polyurethane polyurea particles having fully formed shells and cores which contain a pigment, obtained by an interfacial polymerization reaction between a hydrophobic phase which is a mixture containing a pigment, and a polyisocyanate compound selected from the group consisting of aliphatic di-to tri-isocyanate monomers, aromatic di-to tri-isocyanate monomers, alicyclic di-to tri-isocyanate monomers, tri-to higher polyisocyanurate polyisocyanates, biuret polyisocyanates and isocyanate-terminated urethane-modified polyisocyanate prepolymers and a polyhydroxy compound selected from the group consisting of polyhydric alcohols, polyether glycols, modified polyether polyols, polyester polyols, lactone-containing polyester polyols, epoxy-modified polyester polyols, polyester polyamide polyols, polycarbonate polyols, polybutadiene polyols, polypentadiene polyols, castor oil, castor oil derivatives and hydroxy-containing acrylic copolymers in such proportions that isocyanate groups are stoichiometrically excessive and which can form a three-dimensional crosslinked structure by reaction, and a polyamine selected from the group consisting of aromatic polyamines, aliphatic polyamines and alicyclic polyamines which is less than equivalent of the stoichiometrically excessive isocyanate groups in the hydrophobic phase, and by a urethanization reaction in the interiors of the particles.

5. A process for producing polyurethane polyurea particles having fully formed shells and cores which are capable of containing a pigment, which comprises finely dispersing a hydrophobic phase which is a mixture containing a polyisocyanate compound selected from the group consisting of aliphatic di-to tri-isocyanate monomers, aromatic di-to tri-isocyanate monomers, alicyclic di-to tri-isocyanate monomers, tri-to higher polyisocyanurate polyisocyanates, biuret polyisocyanates and isocyanate-terminated urethane-modified polyisocyanate prepolymers and a polyhydroxy compound selected from the group consisting of polyhydric alcohols, polyether glycols, modified polyether polyols, polyester polyols, lactone-containing polyester polyols, epoxy-modified polyester polyols, polyester polyamide polyols, polycarbonate polyols, polybutadiene polyols, polypentadiene polyols, castor oil, castor oil derivatives and hydroxy-containing acrylic copolymers in such proportions that isocyanate groups are stoichiometrically excessive, and which can form a three-dimensional crosslinked structure by reaction in an aqueous phase containing a protective colloid, then adding a polyamine selected from the group consisting of aromatic polyamines, aliphatic polyamines and alicyclic polyamines in an amount not more than equivalent weight of stoichiometrically excessive isocyanate groups in the hydrophobic phase, and performing an interfacial polymerization between the hydrophobic phase and the polyamine and a urethanization reaction in the interiors of the particles.

6. A process for producing pigmented polyurethane polyurea particles having fully formed shells and cores which contain a pigment, which comprises finely dispersing a hydrophobic phase which is a mixture containing a pigment, and a polyisocyanate compound selected from the group consisting of aliphatic di-to tri-isocyanate monomers, aromatic di-to tri-isocyanate monomers, alicyclic di-to tri-isocyanate monomers, tri-to higher polyisocyanurate polyisocyanates, biuret polyisocyanates and isocyanate-terminated urethane-modified polyisocyanate prepolymers and a polyhydroxy compound selected from the group consisting of polyhydric alcohols, polyether glycols, modified polyether polyols, polyester polyols, lactone-containing polyester polyols, epoxy-modified polyester polyols, polyester polyamide polyols, polycarbonate polyols, polybutadiene polyols, polypentadiene polyols, castor oil, castor oil derivatives and hydroxy-containing acrylic copolymers in such proportions that isocyanate groups are stoichiometrically excessive, and which can form a three-dimensional crosslinked structure by reaction, in an aqueous phase containing a protective colloid, then adding a polyamine selected from the group consisting of aromatic polyamines, aliphatic polyamines and alicyclic polyamines in an amount not more than equivalent weight of stoichiometrically excessive isocyanate groups in the hydrophobic phase, and performing an interfacial polymerization reaction between the hydrophobic phase and the polyamine and a urethanization reaction in the interiors of the particles.

7. A process for producing polyurethane polyurea particles having fully formed shells and cores which are capable of containing a pigment, which comprises finely dispersing a hydrophobic phase which is a mixture containing a polyisocyanate compound selected from the group consisting of aliphatic di-to tri-isocyanate monomers, aromatic di-to tri-isocyanate monomers, alicyclic di-to tri-isocyanate monomers, tri-to higher polyisocyanurate polyisocyanates, biuret polyisocyanates and isocyanate-terminated urethane-modified polyisocyanate prepolymers and a polyhydroxy compound selected from the group consisting of polyhydric alcohols, polyether glycols, modified polyether polyols, polyester polyols, lactone-containing polyester polyols, epoxy-modified polyester polyols, polyester polyamide polyols, polycarbonate polyols, polybutadiene polyols, polypentadiene polyols, castor oil, castor oil derivatives and hydroxy-containing acrylic copolymers in such proportions that isocyanate groups are stoichiometrically excessive, and which mixture can form a three-dimensional crosslinked structure by reaction, in an aqueous phase containing a protective colloid, adding a polyamine selected from the group consisting of aromatic polyamines, aliphatic polyamines and alicyclic polyamines in an amount not more than equivalent weight of the above stoichiometrically excessive isocyanate groups to the resulting aqueous dispersion of the hydrophobic phase, and performing an interfacial polymerization between the hydrophobic phase and the polyamine and a urethanization reaction in the interiors of the particles.

8. A process for producing pigmented polyurethane polyurea particles having fully formed shells and cores which contain a pigment which comprises finely dispersing a hydrophobic phase which is a mixture containing a pigment and also a polyisocyanate compound selected from the group consisting of aliphatic di-to tri-isocyanate monomers, aromatic di-to tri-isocyanate monomers, alicyclic di-to tri-isocyanate, monomers, tri-to higher polyisocyanurate polyisocyanates, biuret polyisocyanates and isocyanate-terminated urethane-modified polyisocyanate prepolymers and a polyhydroxy compound selected from the group consisting of polyhydric alcohols, polyether glycols, modified polyether polyols, polyester polyols, lactone-containing polyester polyols, epoxy-modified polyester polyols, polyester polyamide polyols, polycarbonate polyols, polybutadiene polyols, polypentadiene polyols, castor oil, castor oil derivatives and hydroxy-containing acrylic copolymers in such proportions that isocyanate groups are stoichiometrically excessive, and which mixture can form a three-dimensional crosslinked structure by reaction, then adding a polyamine selected from the group consisting of aromatic polyamines, aliphatic polyamines and alicyclic polyamines in an amount not more than the equivalent weight of the excessive isocyanate groups to the resulting aqueous dispersion of the hydrophobic phase, and performing an interfacial polymerization reaction between the hydrophobic phase and the polyamine and a urethanization reaction in the interiors of the particles.

9. A process for producing polyurethane polyurea particles having fully formed shells and cores which are capable of containing a pigment, which comprises finely dispersing a hydrophobic phase which is a mixture containing a polyisocyanate compound selected from the group consisting of aliphatic di-to tri-isocyanate monomers, aromatic di-to tri-isocyanate monomers, alicyclic di-to tri-isocyanate monomers, tri-to higher polyisocyanurate polyisocyanates, biuret polyisocyanates and isocyanate-terminated urethane-modified polyisocyanate prepolymers and a polyhydroxy compound selected from the group consisting of polyhydric alcohols, polyether glycols, modified polyether polyols, polyester polyols, lactone-containing polyester polyols, epoxy-modified polyester polyols, polyester polyamide polyols, polycarbonate polyols, polybutadiene polyols, polypentadiene polyols, castor oil, castor oil derivatives and hydroxy-containing acrylic copolymers in such proportions that isocyanate groups are stoichiometrically excessive, and which mixture can form a three-dimensional crosslinked structure by reaction, in an aqueous phase containing a protective colloid, and before or after adding a polyamine selected from the group consisting of aromatic polyamines, aliphatic polyamines and alicyclic polyamines to the resulting aqueous dispersion of the hydrophobic phase, adding an organic metal catalyst, and thereafter performing an interfacial polymerization reaction between the hydrophobic phase and the polyamine and a urethanization reaction in the interiors of the particles.

10. A process for producing pigmented crosslinked polyurethane polyurea particles having fully formed shells and cores which contain a pigment which comprises finely dispersing a hydrophobic phase which is a mixture containing a pigment and a polyisocyanate compound selected from the group consisting of aliphatic di-to tri-isocyanate monomers, aromatic di-to tri-isocyanate monomers, alicyclic di-to tri-isocyanate monomers, tri-to higher polyisocyanurate polyisocyanates, biuret polyisocyanates and isocyanate-terminated urethane-modified polyisocyanate prepolymers and a polyhydroxy compound selected from the group consisting of polyhydric alcohols, polyether glycols, modified polyether polyols, polyester polyols, lactone-containing polyester polyols, epoxy-modified polyester polyols, polyester polyamide polyols, polycarbonate polyols, polybutadiene polyols, polypentadiene polyols, castor oil, castor oil derivatives and hydroxy-containing acrylic copolymers in such proportions that isocyanate groups are stoichiometrically excessive, and which mixture can form a three-dimensional crosslinked structure by reaction, in an aqueous phase containing a protective colloid, then adding a polyamine selected from the group consisting of aromatic polyamines, aliphatic polyamines and alicyclic polyamines to the resulting aqueous dispersion of the hydrophobic phase, the amount of the polyamine being not more than one equivalent of the excessive isocyanate groups, and thereafter performing a polyurethane-forming reaction on the surfaces of the particles between the polyisocyanate compound in the hydrophobic phase and the polyamine, and a polyurethane forming reaction in the interiors of the particles; wherein an organic metal catalyst is added during the step of finely dispersing the hydrophobic phase in the aqueous phase and/or before reaching the step of adding the organic metal catalyst to the aqueous dispersion of the hydrophobic phase, and thereafter the interfacial polymerization and the polyurethane-forming reaction in the interiors of the particles are carried out.

11. The polyurethane polyurea particles of claim 1 in which the equivalent ratio of the polyisocyanate compound to the hydroxyl compound is from 1:0.1 to 1:0.9

12. The polyurethane polyurea particles of claim 3 in which the equivalent ration of the polyisocyanate compound to the polyhydroxy compound is from 1:0.1 to 1:0.9

13. The pigmented polyurethane polyurea particles of claim 2 in which the equivalent ratio of the polyisocyanate compound to the polyhydroxy compound is from 1:0.1 to 1:0.9.

14. The pigmented polyurethane polyurea particles of claim 4 in which the equivalent ratio of the polyisocyanate compound to the polyhydroxy compound is from 1:0.1 to 1:0.9.

15. The process of claim 5 in which the equivalent ratio of the polyisocyanate compound to the polyhydroxy compound is from 1:0.1 to 1:0.9.

16. The process of claim 7 in which the equivalent ratio of the polyisocyanate compound to the polyhydroxy compound is from 1:0.1 to 1:0.9.

17. The process of claim 9 in which the equivalent ratio of the polyisocyanate compound to the polyhydroxy compound is from 1:0.1 to 1:0.9.

18. The process of claim 6 in which the equivalent ratio of the polyisocyanate compound and the polyhydroxy compound is from 1:0.1 to 1:0.9.

19. The process of claim 8 in which the equivalent ratio of the polyisocyanate compound and the polyhydroxy compound is from 1:0.1 to 1:0.9.

20. The process of claim 10 in which the equivalent ratio of the polyisocyanate compound and the polyhydroxy compound is from 1:0.1 to 1:0.9.

21. The polyurethane polyurea particles of claim 1 containing a hydrophobic phase in which the hydrophobic phase contains trifunctional or higher polyisocyanate compounds and/or polyhydroxy compounds in an amount of at least 0.1 mole % based on the total amount of the isocyanate compounds and polyhydroxy compounds.

22. The polyurethane polyurea particles of claim 3 in which the hydrophobic phase contains trifunctional or higher polyisocyanate compounds and/or polyhydroxy compounds in an amount of at least 0.1 mole % based on the total amount of the isocyanate compounds and polyhydroxy compounds.

23. The polyurethane polyurea particles of claim 2 containing a hydrophobic phase in which the hydrophobic phase contains trifunctional or higher polyisocyanate compounds and/or polyhydroxy compounds in an amount of at least 0.1 mole % based on the total amounts of the isocyanate compounds and the polyhydroxy compounds.

24. The polyurethane polyurea particles of claim 4 in which the hydrophobic phase contains trifunctional or higher polyisocyanate compounds and/or polyhydroxy compounds in an amount of at least 0.1 mole % based on the total amounts of the polyisocyanate compounds and the polyhydroxy compounds.

25. The process of claim 5 in which the hydrophobic phase contains trifunctional or higher polyisocyanate compounds and/or polyhydroxy compounds in an amount of at least 0.1 mole % based on the total amounts of the polyisocyanate compounds and the polyhydroxy compounds.

26. The process of claim 7 in which the hydrophobic phase contains trifunctional or higher polyisocyanate compounds and/or polyhydroxy compounds in an amount of at least 0.1 mole % based on the total amounts of the polyisocyanate compounds and the polyhydroxy compounds.

27. The process of claim 9 in which the hydrophobic phase contains trifunctional or higher polyisocyanate compounds and/or polyhydroxy compounds in an amount of at least 0.1 mole % based on the total amounts of the polyisocyanate compounds and the polyhydroxy compounds.

28. The process of claim 6 in which the hydrophobic phase contains trifunctional or higher polyisocyanate compounds and/or polyhydroxy compounds in an amount of at least 0.1 mole % based on the total amounts of the polyisocyanate compounds and the polyhydroxy compounds.

29. The process of claim 8 in which the hydrophobic phase contains trifunctional or higher polyisocyanate compounds and/or polyhydroxy compounds in an amount of at least 0.1 mole % based on the total amounts of the polyisocyanate compounds and the polyhydroxy compounds.

30. The process of claim 10 in which the hydrophobic phase contains trifunctional or higher polyisocyanate compounds and/or polyhydroxy compounds in an amount of at least 0.1 mole % based on the total amounts of the polyisocyanate compounds and the polyhydroxy compounds.

31. Polyurethane polyurea particles of claim 1 in which the amount of the polyamine is 0.2 to 1 equivalent per equivalent of the stoichiometrically excessive isocyanate groups contained in the stoichiometrically excessive isocyanate groups.

32. Polyurethane polyurea particles of claim 3 in which the amount of the polyamine is 0.2 to 1 equivalent per equivalent of the stoichiometrically excessive isocyanate groups contained in the stoichiometrically excessive isocyanate groups.

33. The process of claim 5 in which the amount of the polyamine is 0.2 to 1.0 equivalent per equivalent of the stoichiometrically excessive isocyanate groups contained in the hydrophobic phase.

34. The process of claim 7 in which the amount of the polyamine is 0.2 to 1.0 equivalent per equivalent of the stoichiometrically excessive isocyanate groups contained in the hydrophobic phase.

35. The process of claim 9 in which the amount of the polyamine is 0.2 to 1.0 equivalent per equivalent of the stoichiometrically excessive isocyanate groups contained in the hydrophobic phase.

* * * * *